United States Patent [19]

Plummer, III

[11] Patent Number: 4,944,976
[45] Date of Patent: Jul. 31, 1990

[54] SEMI-RIGID PLASTIC JACKET WITH INTERLOCKING LONGITUDINAL SEAM

[75] Inventor: Walter A. Plummer, III, Santa Ana, Calif.

[73] Assignee: The Zippertubing Co., Los Angeles, Calif.

[21] Appl. No.: 312,735

[22] Filed: Feb. 17, 1989

[51] Int. Cl.$^5$ ............................................. F16L 9/00
[52] U.S. Cl. ................................... 428/36.9; 138/165; 138/166; 174/42
[58] Field of Search .................. 428/36.9, 99, 100; 138/165, 166, 167, 168; 174/92

[56] References Cited

U.S. PATENT DOCUMENTS

| 2,144,755 | 1/1939 | Freedman . | |
|---|---|---|---|
| 2,739,089 | 3/1956 | Hageltorn . | |
| 2,782,805 | 2/1957 | Leadbetter . | |
| 3,099,216 | 7/1963 | Jakobsen et al. . | |
| 3,106,941 | 10/1963 | Plummer . | |
| 3,459,234 | 8/1969 | Richter et al. | 138/165 |
| 3,495,306 | 2/1970 | Eichberg . | |
| 3,517,702 | 6/1970 | Mueller et al. | 138/166 |
| 3,638,286 | 2/1972 | Eichberg . | |
| 4,422,478 | 12/1983 | Pentney et al. | 138/166 |

FOREIGN PATENT DOCUMENTS 561916  5/1960  Belgium .
1560502 6/1962  France .

*Primary Examiner*—James Seidleck
*Attorney, Agent, or Firm*—Christie, Parker & Hale

[57] ABSTRACT

This protective jacket of electrical conductors, tubing or the like has a semi-rigid generally tubular sheet body with male and female seam locking members along opposite lateral edges. A single barb-like hook on the male member engages a complementary pocket in the female member for securely interconnecting the edges and closing the seam. The jacket and seam closing members are integrally extruded and have sufficient stiffness that when the seam is closed, the jacket is in hoop tension.

10 Claims, 2 Drawing Sheets

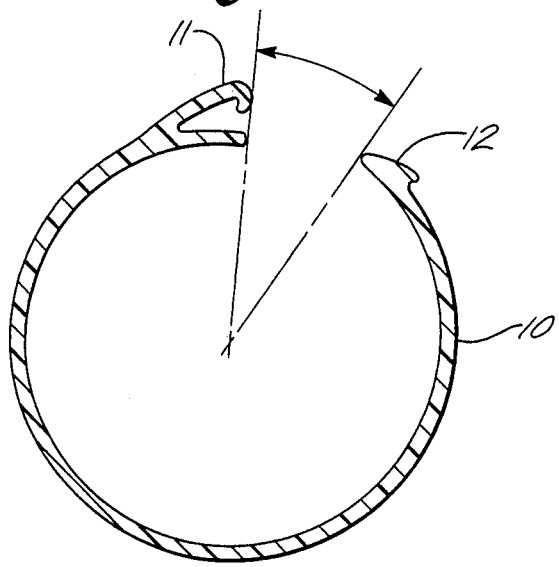
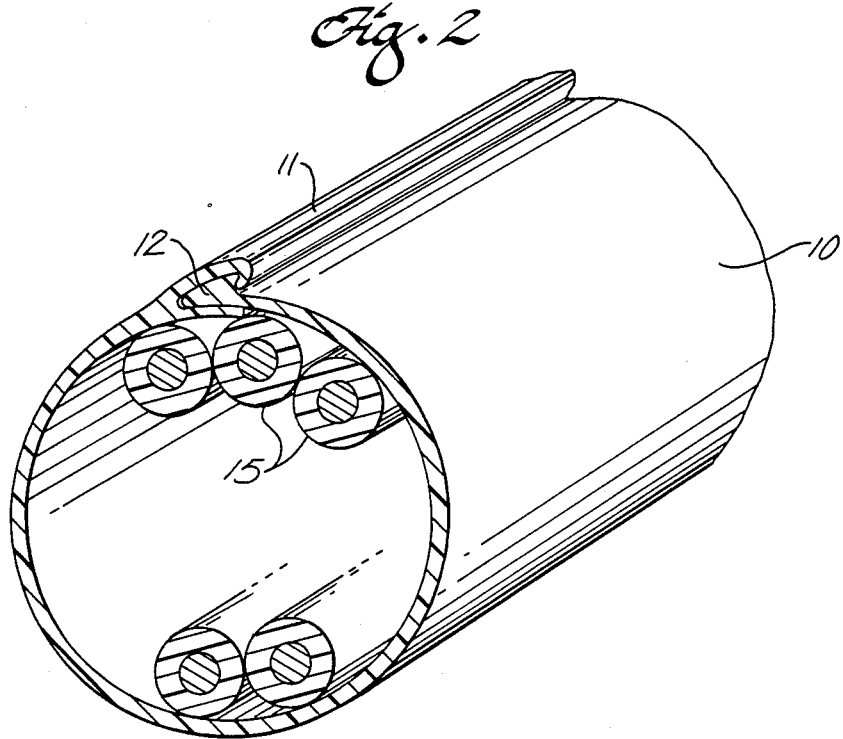

SEMI-RIGID PLASTIC JACKET WITH INTERLOCKING LONGITUDINAL SEAM

FIELD OF THE INVENTION

This invention relates to a protective enclosure or jacket for a plurality of electrical conductors, and more particularly to a one-piece extruded semi-rigid plastic jacket slit lengthwise and provided along its lateral edges with a single pair of interlocking hooks forcibly closable by circumferential contraction of the jacket and held engaged by an underlying slide tang.

BACKGROUND OF THE INVENTION

Many proposals have been made for tubular enclosures having a longitudinal seam of intermeshing components. In effect, such tubular enclosures are sheets of material wrapped around electrical conductors, tubing, ducts, cables or other elongated objects and closed along the longitudinal seam to provide mechanical protection, electrical shielding, environmental sealing, or the like. Such structures have longitudinal seams having portions shaped to interengage one another. Examples of such designs are disclosed in U.S. Pat. Nos. 2,144,755 to Freedman; 2,739,089 to Hageltorn; 2,782,805 to Leadbetter; 3,099,216 to Jakobsen; 3,106,941 to Plummer; 3,495,306 to Eichberg; 3,517,702 to Mueller; 3,638,286 to Eichberg; French Patent No. and Belgian Patent No. 561,916, however, each of these disclosures is subject to disadvantages and shortcomings avoided by the present invention.

For example, no one of these prior disclosures proposes a one-piece tubular construction formed by extrusion of homogeneous material and having a sufficiently high hardness or stiffness to be placed in hoop tension by reason of the extruded material per se. Such prior jackets may be in tension because of contents of the jacket rather than the jacket itself.

Moreover, and of particular importance, all of these disclosures utilize seam strips formed with portions of different thicknesses to facilitate flexing of the thin areas during engagement and disengagement of the seams. For example, in the earlier Eichberg patent a multiplicity of interengaging hooks are provided interconnected by relatively thin grooves which permit the hooks to flex, whereas in the later issued Eichberg patent the lip edges of the hooks are relatively thin and are of material compounded to flex readily during engagement and separation of the seam parts. The same is true of the Freedman and French patents. The Belgian design proposes relatively thick lips on the hooks relative to the much thinner and more flexible mid-section of the hooks.

The Plummer patent describes a technique for producing a tubular enclosure consisting of multiple parts which require assembly. The patent addresses a problem of integrity of additional seams which may be inherent in such construction.

The Leadbetter patent describes a tubular enclosure which is a single piece but it is not uniform. The thickness of the piece varies laterally. Thin spots are made to facilitate bending in the piece which is made flat.

There are similar disadvantages in the Hageltorn and Mueller patents. These patents also teach that the enclosure should be made flat. This creates the dilemma of either making thin spots that are more flexible or making the entire body out of a more flexible and thus less strong material.

The Jakobsen patent describes a jacket for holding explosives within a tube while holding the tube in place within a tunnel being blasted. This patent describes the use of thin materials with good spring characteristics, but obviously is completely unconcerned with durability or life span of the device.

In effect, the prior tubular jackets are made of relatively soft material which is sufficiently flexible to be made flat and then wrapped around objects to be protected. The seam members are appropriate for such materials.

A need has developed for providing good mechanical protection with a removable jacket which can be installed around conduits, wiring or the like. For example, in a variety of automotive applications fuel lines or electrical wires pass in close proximity or through structural components where abrasion may be of concern. In some of these locations it is desirable to install a semi-rigid jacket around a fuel line, for example, which can provide mechanical support for the fuel line as well as preventing crimping or buckling of the fuel line as well as provide enhanced abrasion resistance. Previous jackets made with soft vinyl, for example, are not suitable.

BRIEF SUMMARY OF THE INVENTION

There is, therefore, provided in practice of this invention according to a presently preferred embodiment a tubular jacket for enclosing conductors, tubing, cabling or the like. The jacket has a main body having a longitudinal snap lock seam effective when closed for maintaining the body stressed in hoop tension. There is an elongated generally tubular main body of uniform thickness extruded in one piece from a plastic material having a durometer hardness of not less than D50. The jacket is formed with snap lock male and female seam-forming members along the lateral edge portions of the body. These are spaced apart circumferentially from each other as extruded, and prior to being forcibly nested with one another.

The male member consists of a single hook of generally obtuse triangular shape in cross section integral with, extending along, and confined to the exterior of one lateral edge portion of the body. The triangle has an inner side, a longer outer side, and a shorter outer side with the shorter side being inclined outwardly and away from the adjacent face of the main body at an acute angle to a longitudinal diametric plane through the jacket. The inner side is an extension of the interior surface of the main body and the longer outer side is inclined acutely with respect to the inner side for forming an apex along the lateral edge of the main body.

The female member is V-shaped in cross section with the open end facing toward the adjacent apex of the triangular shaped male member. The female member has a smooth surface inner leg of uniform thickness and an outer leg provided at its outer end with an inwardly projecting hook shaped to interlock with the shorter side of the male member when nested therewith. The hook cooperates with the triangular shaped portion of the male member exterior of the main body for holding the seam members strongly and effectively interlocked with the main body stressed in hoop tension. Preferably the jacket is extruded in its tubular form from polytetrafluoroethylene.

BRIEF DESCRIPTION OF THE DRAWINGS

These and other features and advantages of the present invention will be appreciated as the same becomes better understood by reference to the following detailed description when considered in connection with the accompanying drawings wherein:

FIG. 1 shows a transverse cross section of an illustrative embodiment of tubular jacket constructed according to principles of this invention, as extruded;

FIG. 2 is a similar view of the jacket assembled around a plurality of electrical conductors;

DESCRIPTION

Figure 3:
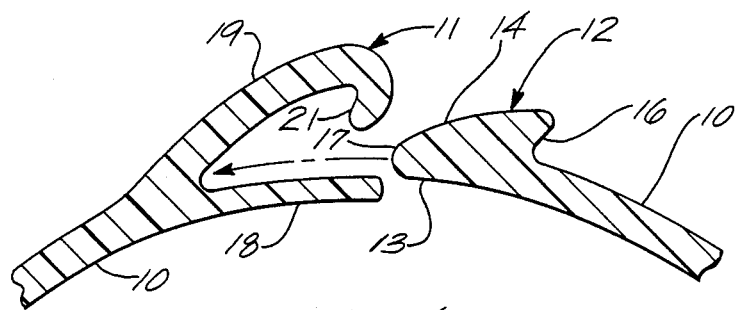
FIG. 3 is a fragmentary cross section of the snap lock seam for the jacket in its normal relaxed condition upon extrusion with the seam components disengaged.

In the embodiment illustrated in FIGS. 1 to 4 there is a one-piece extruded tubular main body 10 of uniform thickness formed with a longitudinal slit. One lateral edge portion of the main body is contoured to form the female half 11 of a snap lock seam. The other lateral edge portion is contoured to form the male half 12 of the seam. Preferably the jacket is extruded of plastic material having a durometer hardness ranging from D50 to D65. Accordingly, the jacket main body, and particularly the seam members, are semi-rigid and highly elastic.

The male member 12 of the snap lock seam is integral with and extends along the entire lateral edge of the jacket. It is in the form of a single barb-shaped hook of generally obtuse triangular shape in transverse cross section. The hook is confined to the exterior of the body so that a substantially smooth or continuous interior is presented to the objects contained within the jacket. Further, in this embodiment the uniform thickness inhibits bending of the jacket adjacent to the hook.

The triangular or barb-shaped hook comprises an inner side 13 which is an extension of the interior surface of the main body 10. It has a longer outer side 14 and a shorter outer side 16. The shorter outer side is inclined outwardly and away from the adjacent face of the main body at an acute angle to a longitudinal diametric plane through the jacket. Preferably the shorter side of the hook is at an angle of about 65° from the surface of the main body. The longer outer side 14 is inclined acutely with respect to the inner side 13 for forming an apex 17 along the lateral edge of the main body. The shorter side is inclined relative to the outer face of the sheet at a relatively larger acute angle, and the longer side is inclined relative to the inner face of the sheet at a relatively smaller acute angle. Further, the longer outer side 14 is somewhat curved.

The female member is V-shaped in cross section with its open end facing toward the adjacent apex of the triangular shaped male member. The interior pocket of the female member is generally complementary to and slightly larger than the triangular shape of the male member. It has a smooth surfaced inner leg or flap 18 of uniform thickness, no thicker than the sheet, and with its innermost surface flush with the inner surface of the main body 10. The apex of the pocket between the inner leg 18 and outer leg 19 is approximately in line with the main body or sheet 10 of the jacket.

The outer leg 19 of the female member is provided at its outer end with an inwardly projecting hook 21 shaped to interlock with the shorter side 16 of the male member when the two are nested together (e.g. at an angle of 65°). The outer female hook cooperates with the triangular shape of the male member for holding the seam members strongly and effectively interlocked for maintaining the main body of the jacket stressed in hoop tension when encompassing a bundle of conductors or the like.

As extruded, the jacket is shaped approximately as shown in FIG. 1 with the male and female seam members closely spaced apart circumferentially of the generally cylindrical jacket. Preferably, the seam members are spaced apart from each other on radial lines in the range of from 15° to 90°. This is the normal relaxed condition of the jacket as extruded. The jacket can be elastically expanded to open the seam further for receiving cabling, tubing, or electrical conductors 15 as in the illustrated embodiment.

After the jacket has been expanded to receive the components to be protected, it is forcibly contracted circumferentially for closing and locking the seam by nesting the male and female members. The inner side and longer outer side of the male member act as pilot surfaces cooperating with the outer surface of the inner leg 18 and end of the hook 21 on the female member to guide the male and female members into interlocking engagement. Thus, the diverging inner and outer surfaces inboard from the apex 17 cam the inner flap and outer J-shaped leg 19 of the female member to deflect and admit and interlock with the relatively thick rigid male member.

Due to the high elasticity of the plastic jacket embodying principles of this invention, the contraction forces necessarily applied to interlock the male and female members places the semi-rigid body of the jacket under hoop tension stress. Once the male and female members are interlocked, the hoop tension stress remains highly effective, along with the inner leg or flap 18, for holding the seam positively assembled. The acute angle of the shorter side 16 of the male member and the complementary re-entrant hook 21 on the female member positively interlock so that the seam is virtually permanently closed. The high stiffness of the high durometer hardness plastic material prevents inadvertent unlocking of the seam, and actually makes intentional locking rather difficult without using special tools which form no part of this invention.

Although the jacket may be made from a variety of commercially available plastic materials having a durometer hardness greater than D50, and preferably in the range of from D50 to D65, a particularly preferred material comprises polytetrafluoroethylene. The high durometer hardness of the plastic material means that it has very little flexibility and a high degree of elasticity. In effect, the tubular jacket is semi-rigid. It has sufficient stiffness that it is substantially retains a tubular shape when open and unsupported. This rigidity and elasticity maintain hoop tension in the jacket and enhance the secure interlocking of the seam members for providing what is essentially a permanent installation of the jacket. Polytetrafluoroethylene is available from E. I. DuPont de Nemours & Company, Wilmington, Del. and other vendors in granular form. The granular thermoplastic polytetrafluoroethylene can be extruded by known techniques in the one-piece configuration of uniform thickness provided in practice of this invention.

The extrusion of the thermoplastic resin may be in the nearly tubular form indicated in FIG. 1 as it passes out of the extrusion press. Alternatively, the resin may be extruded with the main body portion being more nearly flat and the hot extruded material may be curled to the form illustrated in FIG. 1 while the resin remains in a plastic state.

When made of polytetrafluoroethylene this jacket exhibits unmatched mechanical, electrical, chemical, high and low temperature, and low friction characteristics. It provides high quality protection to cabling, tubing or the like in extremely hostile environmental conditions, including high and low temperatures, severe vibration and agitation, moderate abrasion, and it is immune to attack by industrial fluids, lubricants, fuels, hydraulic fluids, and chemicals generally. It is therefore suitable for protecting conductors and tubing retained in a generally stationary installed position.

By way of example, a tubular jacket as described herein having a diameter in the order of one-half to one and one-half inches has a wall thickness of approximately 30 mils. The inner leg 18 of the female member is approximately two-thirds as thick as the main body and its inner surface is spaced from the closest portion of the hook 21 by about 35 mils; that is, slightly more than the thickness of the main body. Thus, as illustrated in FIG. 4 the hook on the female member closes around the male member to within a very short distance from the outer surface of the main body.

The maximum radial thickness of the male member near the inboard end of the longer side 14 is about 75 mils. Further, as can be seen in FIG. 4, the interior of the female member is of approximately the same dimensions. It will, of course, be understood that these dimensions are provided by way of example to provide excellent structural and functional results. Other dimensions may be used as desired. Preferably the diameter of the tubular jacket is such that it snugly encloses the conductors or tubing to be protected.

Figure 4:
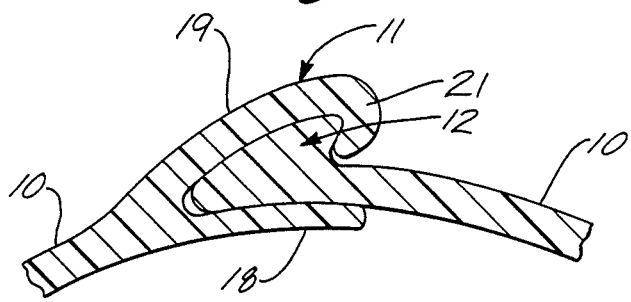
FIG. 4 is a transverse cross section of the snap lock seam in assembled condition.
Figure 5:
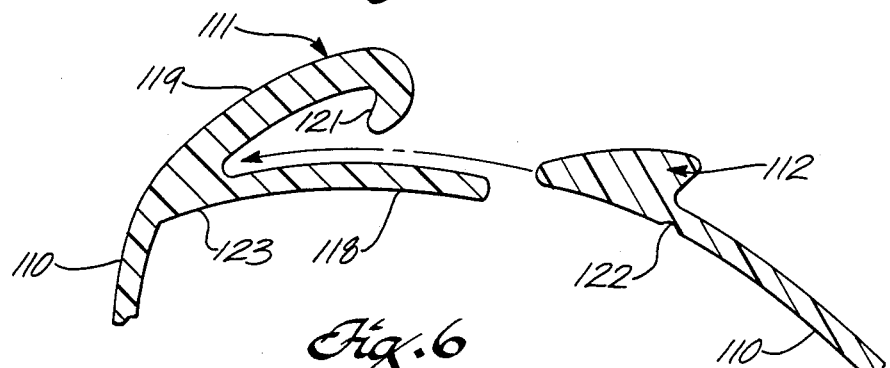
FIG. 5 is a transverse cross section of another embodiment of the snap lock seam when open.
Figure 6:
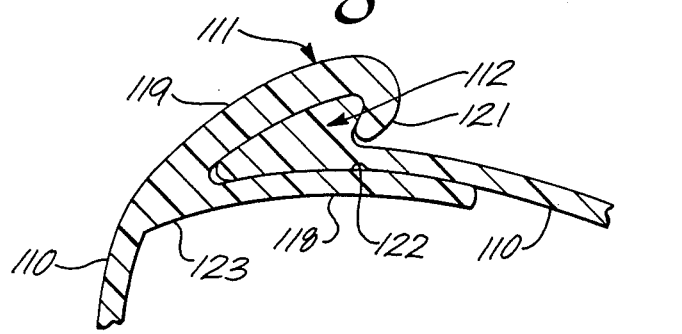
FIG. 6 is a transverse cross section of the second embodiment with the seam members engaged.

FIGS. 5 and 6 illustrate another embodiment of snap lock seam constructed according to principles of this invention, which is rather similar to the embodiment illustrated in FIGS. 3 and 4. Because of this similarity the various portions of the second embodiment are identified with reference numerals 100 larger than the reference numerals used for the corresponding features in FIGS. 3 and 4. Thus, for example, the male member in the embodiment illustrated in FIGS. 3 and 4 is identified in the drawings with the reference numeral 12 and the corresponding male member in the embodiment of FIGS. 5 and 6 is identified as 112.

The barb-shaped hook of the male member 112 in this embodiment is substantially identical to the hook in the preceding embodiment. A very slight longitudinal crease 122 is provided approximately opposite the intersection of the short side 116 of the male hook and the main body 110 of the tubular jacket. The crease may assist in alignment of the triangular male hook with the female member.

Similarly, a slight crease 123 is provided on the inner face of the jacket opposite the intersection of the outer leg 119 of the female member with the main body of the jacket. A flap 118 extends somewhat inwardly at an obtuse angle from the main body of the sheet 110. It has about the same thickness as the sheet. The crease also assists in alignment of the relatively stiff male and female members, particularly for relatively smaller diameter tubular jackets. In addition, the inner leg of flap 118 of the female member is longer than in the embodiment hereinabove illustrated so as to extend appreciably beyond the end of the hook 121 on the outer leg of the female member. This provides enhanced guidance of the male member, as will be apparent by comparing FIGS. 5 and 3.

It will be understood that the tubular jackets hereinabove described and illustrated are merely illustrative of presently preferred embodiments of this invention. Modifications and variations will be apparent to those skilled in the art. It is therefore to be understood that within the scope of the appended claims the invention may be practiced otherwise than as specifically described.

What is claimed is:

1. A tubular jacket for enclosing conductors, tubing, cabling, or the like, which jacket has a main body having a longitudinal snap-lock seam effective when closed for maintaining the body stressed in hoop tension and comprising:

an elongated, generally tubular main body of uniform thickness extruded in one piece from a plastic material having a durometer hardness of not less than D50 and formed with snap lock male and female seam forming members along the lateral edge portions of the body and closely spaced apart circumferentially from each other as extruded and prior to being forcibly nested with one another;

said male member consisting of a single asymmetrical hook of generally obtuse triangular shape in cross section, integral with, extending along, and with a portion of thickness greater than the thickness of the body being confined to the exterior of one lateral edge portion of the main body, said triangle comprising an inner side, a longer outer side, and a shorter outer side, with the shorter outer side being inclined outwardly and away from the adjacent face of the main body at an acute angle to the outer face of the jacket, the inner side being an extension of the interior surface of the main body, and the longer outer side being inclined acutely with the inner side for forming an apex along the lateral edge of the main body; and said female member being V-shaped in cross section, with the open end thereof facing toward the adjacent apex of the triangular shaped male member, and having a smooth surfaced inner leg of uniform thickness and having an outer leg provided at its outer end with an inwardly projecting hook shaped to interlock with the shorter side of the male member when nested therewith, said hook cooperating with the triangular shaped portion of the male member positioned exteriorly of the main body when nested for holding the seam members strongly and effectively interlocked with the main body stressed in hoop tension.

2. A tubular jacket as defined in claim 1 characterized in that said plastic material employed in extruding said one-piece jacket is polytetrafluoroethylene.

3. A tubular jacket as defined in claim 1 characterized in that said plastic material has a durometer hardness in the range of D50 and D65.

4. A tubular jacket as defined in claim 1 characterized in that the short outer side of the male member forms a 65° angle with the outer surface of the main body, and the inner side of the hook on the female member is complementary with the short side on the male member.

5. A closable and openable tubular protective jacket extruded in one piece for enclosing cabling, tubing or the like, comprising:
   an elongated extruded sheet of semi-rigid plastic material having sufficient stiffness that it substantially retains a tubular shape when open and unsupported;
   a generally triangular asymmetrical barb-shaped member extruded integral with the sheet along one longitudinal edge of the sheet, an inner face of the barb-shaped member being an extension of the inner face of the sheet, a shorter outer face of the barb-shaped member extending rearwardly away from the sheet at a relatively larger acute angle from the outer face of the sheet, and a longer outer face of the barb-shaped member being generally curved and extending rearwardly toward the sheet at a relatively smaller acute angle so that the barb-shaped member has a cross-section generally in the form of an obtuse triangle with the portion thicker than the thickness of the sheet being entirely on the exterior of the jacket;
   an inner flap extruded integral with the sheet along the opposite longitudinal edge of the sheet, the flap being effectively a continuation of the sheet;
   a hook-shaped member extruded integral with the sheet along said opposite edge and spaced apart from the flap a distance greater than the thickness of the sheet for forming with the flap a female pocket having an obtuse triangular shape substantially complementary to the shape of the barb-shaped member and sufficiently larger than the barb-shaped member for accommodating entry of the barb-shaped member into the pocket by deflection of the hook-shaped member and the flap, the hook shaped member having an inner face at the same angle from the flap as the relatively larger angle on the barb shaped member for engaging the shorter face of the barb-shaped member so that the barb- and hook-shaped members cooperate for forming a securely closable longitudinal seam for the jacket when the barb-shaped member is nested with the hook-shaped member.

6. A jacket as recited in claim 5 wherein the apex of the pocket between the hook-shaped member and the flap is approximately in line with the sheet.

7. A jacket as recited in claim 5 wherein the flap has no greater thickness than the sheet.

8. A jacket as recited in claim 5 wherein the flap extends inwardly at an obtuse angle from the extent of the sheet.

9. A jacket as recited in claim 5 wherein the sheet has an open-sided, generally cylindrical transverse cross section with the disengaged hook- and barb-shaped members being approximately on radial lines spaced apart at an angle in the range of from 15° to 90°.

10. A jacket as recited in claim 5 wherein the sheet has an open-sided, generally cylindrical transverse cross section with the disengaged hook- and barb-shaped members being sufficiently far apart that the jacket is in hoop tension when the hook- and barbshaped members are engaged.

* * * * *

UNITED STATES PATENT AND TRADEMARK OFFICE
CERTIFICATE OF CORRECTION

PATENT NO. : 4,944,976

DATED : July 31, 1990

INVENTOR(S) : Walter A. Plummer, III

It is certified that error appears in the above-identified patent and that said Letters Patent is hereby corrected as shown below:

ON TITLE PAGE:

In the Astract, line 1, delete "of" and insert therefor -- for --.

Column 1, line 29, after "French Patent No." insert -- 1,560,502 --.

Signed and Sealed this

Third Day of December, 1991

Attest:

HARRY F. MANBECK, JR.

*Attesting Officer*     *Commissioner of Patents and Trademarks*